C. E. STELLER.

FASTENER FOR THE MEETING RAILS OF SASHES.

No. 10,259. Reissued Dec. 12, 1882.

Witnesses:
E. G. Asmus
E. W. Erwin

Inventor:
Charles E. Steller
By Jas. B. Erwin,
Attorney.

N. PETERS, Photo-Lithographer, Washington, D. C.

UNITED STATES PATENT OFFICE.

CHARLES E. STELLER, OF MILWAUKEE, WISCONSIN.

FASTENER FOR THE MEETING-RAILS OF SASHES.

SPECIFICATION forming part of Reissued Letters Patent No. 10,259, dated December 12, 1882.

Original No. 206,636, dated July 30, 1878. Application for reissue filed April 12, 1882.

*To all whom it may concern:*

Be it known that I, CHARLES E. STELLER, a citizen of the United States, residing at Milwaukee, in the county of Milwaukee and State of Wisconsin, have invented certain new and useful Improvements in Sash-Fasteners; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My invention relates to improvements in that class of fasteners the swinging levers of which are pivoted upon the upper rail of the lower sash and adapted, when locked, to engage in a catch upon the lower rail of the upper sash.

My improvements pertain more especially, first, to the device by which the swinging lever is secured in its locking position; and, second, to the device for supporting the swinging lever, by which the pivot is surrounded and relieved from the lateral strain to which it would otherwise be subjected, as hereinafter more fully set forth.

I am aware that the swinging levers of sash-fasteners have heretofore been locked by sliding bolts, as shown in my Patent No. 198,861, also by jointed levers having no latch, which levers are formed in two parts, the front ends of which are thrown up by a spring into locking position, as shown in patents to Arnold, No. 161,652, and Breckenridge, No. 162,614.

I am also aware of the forms of fasteners shown in Patents No. 161,929 and No. 30,571. I therefore limit and qualify my present claims accordingly, making no claims to the devices therein shown.

By my improvement the swinging lever is retained in the locking position by a latch combined therewith and moving horizontally with said lever, the forward end of which latch has a free upward and downward movement, and is adapted to drop automatically into the recess provided therefor in the base-plate, which latch is disengaged by an upward pressure applied to the lower side, whereby the lever is released. Both the swinging lever and the base-plate are provided with sleeves, which are adapted to fit into each other around the pivot, whereby the lever is supported and the pivot relieved from all lateral strain.

Figure 1:
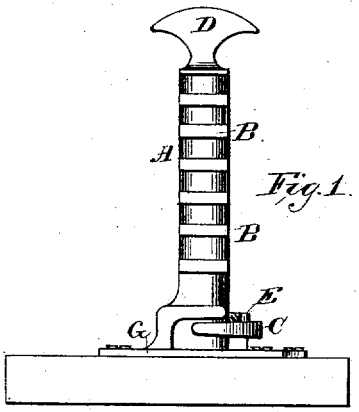
Figure 2:
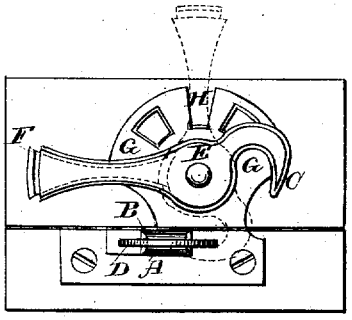
Figure 4:
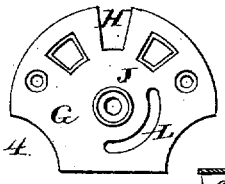
Figure 3:
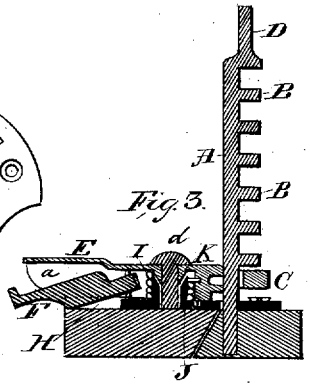
Figure 5:
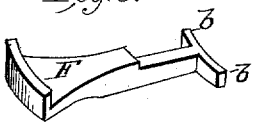
Figure 6:
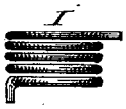

My invention is further explained by reference to the accompanying drawings, in which Figure 1 represents an elevation. Fig. 2 is a plan view. Fig. 3 is a vertical section. Figs. 4, 5, and 6 are enlarged detail views.

Like parts are represented by the same reference-letters throughout the several views.

The present improvement pertaining more especially to the locking-lever, it is obvious that the same may be used to engage either with a striking-plate or an adjusting-standard having a greater or less number of stops or shoulders.

E is the swinging lever, which is pivoted at or near its center to the base-plate G, adapted to be secured to the upper rail of the lower sash. The front end of the lever E is provided with a latch, F, which is loosely attached thereto and moves horizontally with said lever, and its front end drops automatically when brought above the retaining-recess in the base-plate, whereby the lever is locked in position.

H is a recess formed in the base-plate for the reception of the latch F.

The rear end of the lever is provided with a hook, C, cast in the same piece therewith, adapted to engage in a catch, B, on standard A, secured to the upper sash.

*a* is a recess formed in the lever for the reception of the latch F, which is retained in the recess by lugs *b b*, which engage in recesses or against shoulders formed in the lever, and which prevent the latch from dropping out of the recess or being withdrawn therefrom, while they permit of the free upward and downward movement of the forward end of the latch, said lugs *b b* serving as the pivotal bearings upon which the latch turns as its forward end moves upward and downward.

The base-plate G is provided with a funnel-shape sleeve, J, fitting into which is a similar sleeve, K, formed on the lever. The sleeves thus united support the lever and relieve the retaining-pivot N from the twisting lateral strain to which it would otherwise be subjected.

Having thus described my invention, I do not claim a latch, broadly, being aware that latches in sash-locks have been used in various ways; but

What I claim as new, and desire to secure by Letters Patent, is—

1. The combination of a base-plate, provided at its front side with a retaining-recess, with a swinging lever pivoted centrally upon said base-plate and provided at its rear end with a locking-hook and at its front end with a latch, said latch having pivotal bearings at its rear end in said lever, the front end of said latch being adapted to drop automatically in said retaining-recess in the base-plate in front of the retaining-pivot of said lever, substantially as set forth.

2. The combination of base-plate G, provided with recess H and sleeve J, with lever E, provided with sleeve K, pivot N, latch F, and hook C, formed on the rear end of said lever, adapted to engage in a striking-plate on the lower rail of the upper sash, as set forth.

In testimony whereof I affix my signature in presence of two witnesses.

C. E. STELLER.

Witnesses:
JAS. B. ERWIN,
B. F. WEST.